United States Patent
Gordon et al.

(10) Patent No.: US 11,651,344 B2
(45) Date of Patent: *May 16, 2023

(54) SYSTEM AND METHOD FOR TRANSACTION HANDOFF AND COMPLETION EMPLOYING INDIRECT TOKEN

(71) Applicant: Toast, Inc., Boston, MA (US)

(72) Inventors: Benjamin Gordon, Scituate, MA (US); Lori R. Tavis, Boston, MA (US)

(73) Assignee: Toast, Inc., Boston, MA (US)

( * ) Notice: Subject to any disclaimer, the term of this patent is extended or adjusted under 35 U.S.C. 154(b) by 251 days.

This patent is subject to a terminal disclaimer.

(21) Appl. No.: 17/122,299

(22) Filed: Dec. 15, 2020

(65) Prior Publication Data

US 2022/0188795 A1    Jun. 16, 2022

(51) Int. Cl.
*G06Q 20/20* (2012.01)
*G06Q 20/24* (2012.01)

(52) U.S. Cl.
CPC ......... *G06Q 20/206* (2013.01); *G06Q 20/202* (2013.01); *G06Q 20/24* (2013.01)

(58) Field of Classification Search
CPC .... G06Q 20/206; G06Q 20/202; G06Q 20/24; G06Q 20/085; G06Q 20/204;
(Continued)

(56) References Cited

U.S. PATENT DOCUMENTS 7,774,231 B2 * 8/2010 Pond .................. H04M 17/026
                                                    455/406
8,332,323 B2 * 12/2012 Stals .................. G06Q 20/40
                                                     705/40
(Continued)

FOREIGN PATENT DOCUMENTS

CA     3018456          3/2020
CA     3018456 A1 *     3/2020    ............ G06Q 20/02
(Continued)

OTHER PUBLICATIONS

Hassan, MD Arif et al. "An Improved Time-Based One Time Password Authentication Framework for Electronic Payments." (IJACSA) *International Journal of Advanced Computer Science and Applications*. vol. 11, No. 11, 2020 p. 359-366.

(Continued)

*Primary Examiner* — Ashford S Hayles
(74) *Attorney, Agent, or Firm* — Richard K. Huffman; Huffman Patent Group, LLC

(57) ABSTRACT

A method for transaction handoff includes: registering a payment instrument with a server, associating the payment instrument with indirect tokens, and storing a payment token that associates the indirect tokens with the payment instrument and a device identifier in a database record; via a device, receiving an indirect token from the server; via a point-of-sale (POS) terminal, entering the indirect token, and transmitting indirect token via the internet cloud to the server; via the server, using the payment token to access the device identifier and transmitting a push notification; upon acceptance of the push notification, executing an application on the device and simultaneously displaying transaction details on both the device and POS terminal; receiving completion data that is entered via the device and transmitting the completion data to the server; and completing the transaction at the server and notifying the POS terminal and the device that the transaction is complete.

20 Claims, 8 Drawing Sheets

(58) Field of Classification Search
CPC ............ G06Q 20/326; G06Q 20/3274; G06Q 20/3674; G06Q 20/38215; G06Q 20/385; G06Q 20/409
See application file for complete search history.

(56) References Cited

U.S. PATENT DOCUMENTS

| | | | | |
|---|---|---|---|---|
| 8,616,439 B1* | 12/2013 | Azen | | G06Q 20/3274 235/375 |
| 8,639,619 B1 | 1/2014 | Priebatsch | | |
| 8,770,478 B2 | 7/2014 | Priebatsch | | |
| 8,924,260 B1 | 12/2014 | Priebatsch | | |
| 8,955,084 B2* | 2/2015 | Do | | H04L 9/3297 726/10 |
| 8,984,276 B2* | 3/2015 | Benson | | H04L 9/3226 713/155 |
| 9,038,157 B1* | 5/2015 | Santiago, Jr. | | G06F 21/35 726/9 |
| 9,361,610 B2* | 6/2016 | Matotek | | G06Q 20/204 |
| 9,519,901 B1* | 12/2016 | Dorogusker | | G06Q 20/3226 |
| 9,530,289 B2 | 12/2016 | Priebatsch | | |
| 9,852,417 B2* | 12/2017 | Tyler | | G06Q 20/321 |
| 9,947,183 B2 | 4/2018 | Priebatsch | | |
| 10,192,215 B1* | 1/2019 | Mossoba | | G06Q 20/346 |
| 10,380,849 B2 | 8/2019 | Priebatsch | | |
| 10,389,730 B2 | 8/2019 | Prabhu | | |
| 10,445,629 B2* | 10/2019 | Singh | | G06Q 20/3276 |
| 10,453,050 B1* | 10/2019 | Arumugam | | G06Q 20/4014 |
| 10,475,012 B2 | 11/2019 | Black | | |
| 10,482,449 B1* | 11/2019 | Gantert | | G06Q 20/3274 |
| 10,542,010 B2 | 1/2020 | Gordon et al. | | |
| 10,558,978 B1* | 2/2020 | Rayudu | | G06Q 20/206 |
| 10,783,518 B1* | 9/2020 | Pearce | | G06Q 20/385 |
| 10,944,742 B2 | 3/2021 | Mumma et al. | | |
| 10,977,657 B2 | 4/2021 | Patterson | | |
| 11,057,531 B2 | 7/2021 | Keery et al. | | |
| 11,068,899 B2 | 7/2021 | Howard | | |
| 11,132,425 B1* | 9/2021 | Cohen | | G06Q 20/4093 |
| 11,303,629 B2 | 4/2022 | Kurian | | |
| 2004/0030601 A1* | 2/2004 | Pond | | G06Q 20/327 705/16 |
| 2005/0025358 A1* | 2/2005 | Qi | | G06T 7/20 348/E5.067 |
| 2005/0102188 A1* | 5/2005 | Hutchison | | G06Q 20/367 705/26.1 |
| 2005/0125301 A1* | 6/2005 | Muni | | G06Q 30/06 705/23 |
| 2005/0203854 A1* | 9/2005 | Das | | G06Q 20/389 705/64 |
| 2005/0211763 A1* | 9/2005 | Sgambati | | G06Q 40/00 235/379 |
| 2006/0049256 A1* | 3/2006 | von Mueller | | G06Q 20/3552 705/64 |
| 2007/0056385 A1 | 3/2007 | Lorenz | | |
| 2007/0194123 A1* | 8/2007 | Frantz | | G06K 17/0022 235/462.46 |
| 2007/0194127 A1* | 8/2007 | Rathus | | G09B 5/062 235/472.01 |
| 2008/0103984 A1* | 5/2008 | Choe | | H04L 9/3228 705/16 |
| 2008/0222048 A1* | 9/2008 | Higgins | | G07G 1/14 705/67 |
| 2009/0057393 A1* | 3/2009 | Merkow | | G06Q 30/06 235/379 |
| 2009/0240626 A1* | 9/2009 | Hasson | | G06Q 20/3227 705/17 |
| 2009/0328168 A1* | 12/2009 | Lee | | G06F 21/34 726/6 |
| 2010/0211506 A1* | 8/2010 | Chang | | G06Q 20/3823 235/375 |
| 2010/0257097 A1* | 10/2010 | Saban | | G06Q 20/40 709/206 |
| 2010/0306318 A1* | 12/2010 | Fitzpatrick | | G06F 16/9535 345/157 |
| 2011/0251892 A1* | 10/2011 | Laracey | | G06Q 20/20 705/16 |
| 2012/0078735 A1* | 3/2012 | Bauer | | G06Q 20/36 705/16 |
| 2012/0130889 A1* | 5/2012 | Lyons | | G06Q 20/3272 705/39 |
| 2012/0203697 A1* | 8/2012 | Morgan | | G06Q 20/027 705/44 |
| 2012/0209749 A1* | 8/2012 | Hammad | | G06Q 20/326 705/27.1 |
| 2012/0246018 A1* | 9/2012 | Sathe | | G06Q 10/087 705/16 |
| 2012/0284130 A1 | 11/2012 | Lewis et al. | | |
| 2013/0005352 A1* | 1/2013 | Jones | | G07B 15/00 455/456.1 |
| 2013/0036051 A1* | 2/2013 | Giordano | | G06Q 20/306 705/44 |
| 2013/0054336 A1* | 2/2013 | Graylin | | G06Q 40/02 705/21 |
| 2013/0097078 A1* | 4/2013 | Wong | | G06Q 20/10 705/44 |
| 2013/0151358 A1* | 6/2013 | Ramalingam | | G06Q 20/202 705/16 |
| 2013/0185209 A1 | 7/2013 | Ahn | | |
| 2013/0238455 A1* | 9/2013 | Laracey | | G06Q 20/102 705/21 |
| 2013/0246203 A1* | 9/2013 | Laracey | | G06Q 30/06 705/40 |
| 2014/0129428 A1* | 5/2014 | Tyler | | G06Q 20/3276 705/39 |
| 2014/0143075 A1* | 5/2014 | Eason, Jr. | | G06Q 20/322 705/17 |
| 2014/0143146 A1* | 5/2014 | Passanha | | G06Q 20/385 705/44 |
| 2014/0164254 A1* | 6/2014 | Dimmick | | G06Q 20/4014 705/44 |
| 2014/0279403 A1* | 9/2014 | Baird | | G06Q 20/027 705/38 |
| 2014/0351126 A1 | 11/2014 | Priebatsch | | |
| 2014/0365371 A1* | 12/2014 | Ohlhausen | | G06Q 20/20 705/44 |
| 2015/0081550 A1 | 3/2015 | Priebatsch et al. | | |
| 2015/0100426 A1* | 4/2015 | Hartzell | | H04W 4/023 705/14.58 |
| 2015/0213565 A1* | 7/2015 | Garrett | | G06Q 20/102 705/15 |
| 2015/0227925 A1 | 8/2015 | Filler | | |
| 2015/0269559 A1* | 9/2015 | Inotay | | G06Q 20/02 705/44 |
| 2015/0278805 A1* | 10/2015 | Spencer, III | | G06Q 20/3274 705/44 |
| 2015/0278811 A1* | 10/2015 | Lalchandani | | G06Q 20/202 705/42 |
| 2015/0278870 A1 | 10/2015 | Priebatsch | | |
| 2015/0348024 A1* | 12/2015 | Asokan | | G06Q 20/3276 705/76 |
| 2015/0379506 A1* | 12/2015 | Griffin | | G06Q 20/3224 705/44 |
| 2016/0117673 A1* | 4/2016 | Landrok | | G06Q 20/409 705/71 |
| 2016/0239833 A1* | 8/2016 | Venugopalan | | G06Q 20/38215 |
| 2016/0295404 A1* | 10/2016 | Gouget | | H04L 63/0876 |
| 2016/0371668 A1 | 12/2016 | Priebatsch et al. | | |
| 2017/0098264 A1* | 4/2017 | Priebatsch | | H04L 67/52 |
| 2017/0132630 A1* | 5/2017 | Castinado | | G06Q 20/4014 |
| 2017/0161728 A1 | 6/2017 | Satyanarayan et al. | | |
| 2017/0178097 A1* | 6/2017 | Karnik | | G06Q 20/3276 |
| 2017/0236189 A1 | 8/2017 | Srinath | | |
| 2017/0262841 A1* | 9/2017 | Good | | H04L 63/0876 |
| 2017/0295258 A1 | 10/2017 | Raleigh et al. | | |
| 2018/0005243 A1* | 1/2018 | Zovi | | G06Q 20/405 |
| 2018/0068293 A1* | 3/2018 | Dunne | | G06Q 20/3223 |
| 2018/0232732 A1* | 8/2018 | Rodrigues | | G06Q 20/327 |
| 2018/0247296 A1* | 8/2018 | Win | | G06Q 20/385 |
| 2018/0260806 A1* | 9/2018 | Bhuma | | G06Q 20/3226 |

(56) References Cited

U.S. PATENT DOCUMENTS

| | | | |
|---|---|---|---|
| 2018/0315045 A1* | 11/2018 | Leyva | G06Q 20/388 |
| 2019/0005529 A1 | 1/2019 | Lee et al. | |
| 2019/0108509 A1* | 4/2019 | Hammad | G06Q 20/3278 |
| 2019/0172044 A1* | 6/2019 | Wilson | G06Q 20/02 |
| 2019/0236585 A1* | 8/2019 | Jeong | H04W 12/71 |
| 2019/0385142 A1* | 12/2019 | Bell | G06Q 20/209 |
| 2019/0385160 A1* | 12/2019 | Safak | G06Q 20/3829 |
| 2019/0392422 A1* | 12/2019 | Yim | H04W 12/37 |
| 2020/0034870 A1* | 1/2020 | Dao | G06Q 20/401 |
| 2020/0082668 A1 | 3/2020 | Foley et al. | |
| 2020/0097937 A1* | 3/2020 | Dunjic | G06Q 20/40 |
| 2020/0342439 A1* | 10/2020 | Lau | G06Q 20/3274 |
| 2020/0364720 A1* | 11/2020 | Lally | G06Q 20/3821 |
| 2020/0410500 A1 | 12/2020 | Dorogusker | |
| 2021/0233069 A1 | 7/2021 | Wang et al. | |
| 2021/0406868 A1* | 12/2021 | Brightman | G06Q 20/42 |
| 2022/0148009 A1* | 5/2022 | Vyas | G06Q 30/0185 |
| 2022/0239813 A1 | 7/2022 | Harada et al. | |

FOREIGN PATENT DOCUMENTS

| | | | |
|---|---|---|---|
| EP | 2128809 | 12/2009 | |
| EP | 2128809 A1 * | 12/2009 | G06Q 20/02 |
| EP | 2857996 | 4/2015 | |
| EP | 2857996 A1 * | 4/2015 | G06F 16/583 |
| WO | WO2013142209 | 9/2013 | |
| WO | WO-2013142209 A1 * | 9/2013 | G06K 5/00 |
| WO | WO2017072647 | 5/2017 | |
| WO | WO-2017072647 A1 * | 5/2017 | |
| WO | WO2017103701 | 6/2017 | |
| WO | WO-2017103701 A1 * | 6/2017 | |
| WO | WO2020142412 | 7/2020 | |
| WO | WO-2020142412 A1 * | 7/2020 | G06Q 20/02 |
| WO | WO2022081965 | 4/2022 | |
| WO | WO-2022081965 A1 * | 4/2022 | |

OTHER PUBLICATIONS

Sung, Soonhwa et al. "Mobile Payment Based on Transaction Certificate Using Cloud Self-Proxy Server." *ETRI Journal*, vol. 39, No. 1. Feb. 2017. pp. 135-144.

Revel and Shell Deploy Cloud-Based POS Platform. vol. 35. Boston: Worldwide Videotex, 2016. Print. pp. 5-7.

* cited by examiner

DEVICE HANDOFF FOR TICKET COMPLETION VIA PAYMENT AUTHORIZATION

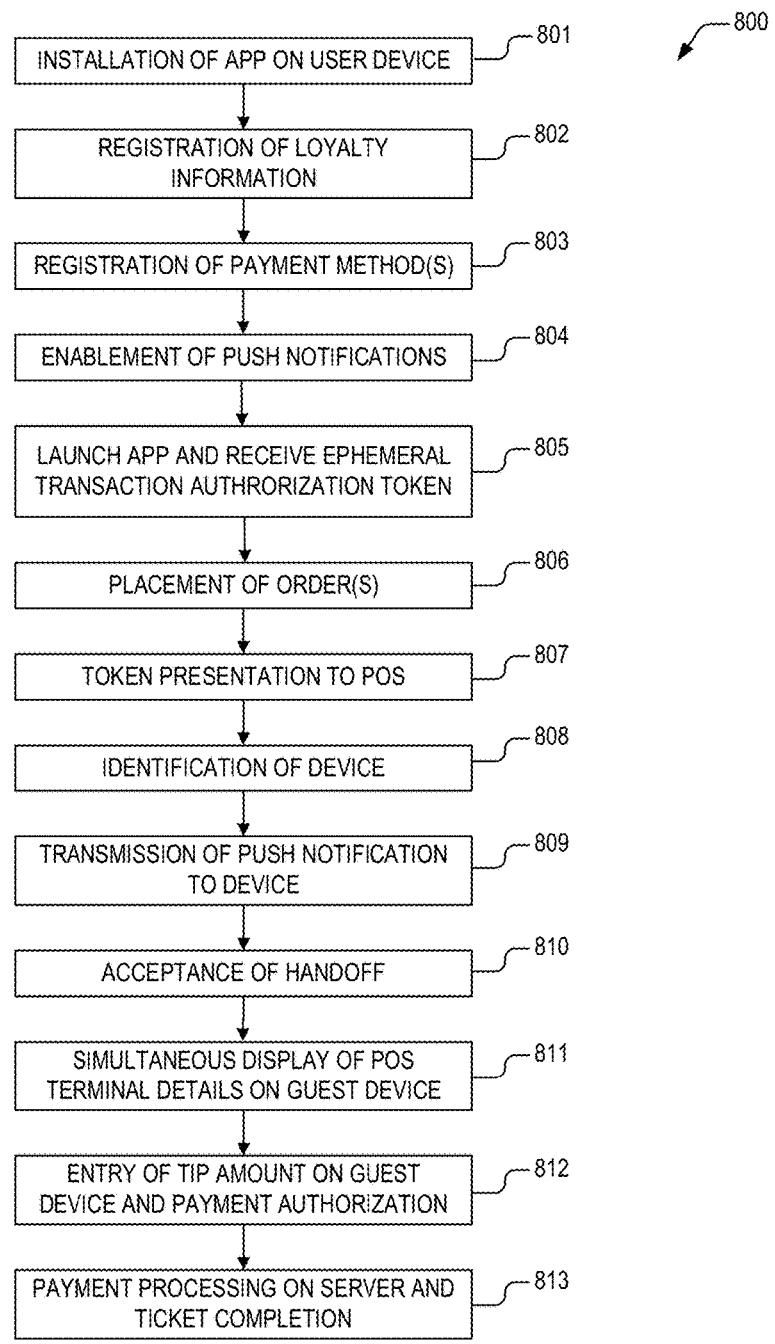

SYSTEM AND METHOD FOR TRANSACTION HANDOFF AND COMPLETION EMPLOYING INDIRECT TOKEN

CROSS-REFERENCE TO RELATED APPLICATIONS

This application is related to the following co-pending U.S. Patent Applications, each of which has a common assignee and common inventors, the entireties of which are herein incorporated by reference.

| Ser. No. | FILING DATE | TITLE |
| --- | --- | --- |
| 17/122,100 | Dec. 15, 2020 | SYSTEM AND METHOD FOR TRANSACTION HANDOFF AND COMPLETION EMPLOYING EPHEMERAL TOKEN |
| 17/122,224 | Dec. 15, 2020 | POINT-OF-SALE TERMINAL FOR TRANSACTION HANDOFF AND COMPLETION EMPLOYING EPHEMERAL TOKEN |
| 17/122,270 | Dec. 15, 2020 | SERVER FOR TRANSACTION HANDOFF AND COMPLETION EMPLOYING EPHEMERAL TOKEN |
| 17/122,322 | Dec. 15, 2020 | POINT-OF-SALE TERMINAL FOR TRANSACTION HANDOFF AND COMPLETION EMPLOYING INDIRECT TOKEN |
| 17/122,356 | Dec. 15, 2020 | SERVER FOR TRANSACTION HANDOFF AND COMPLETION EMPLOYING INDIRECT TOKEN |

BACKGROUND OF THE INVENTION

Field of the Invention

This invention relates in general to the field of retail operations, and more specifically to methods and apparatus for improved transaction processing.

Description of the Related Art

It is rare these days to walk into a retail store or restaurant that has a manually operated cash register along with manual (i.e., paper and pencil) order entry. Rather, it is more common to find one or more electronic point-of-sale terminals through which a guest may order goods and/or services. Whether the terminals are employed in a fixed position (such as a self-serve or attended kiosk) or hand carried by wait staff, the advantages over prior manual entry mechanisms are pronounced and include more accurate presentation of goods and services, accurate and up to date pricing, customized loyalty presentations, automated transmission of orders for fulfillment, and automated payment processing.

Yet, as one skilled in the art will appreciate, it is often the payment step of a transaction that becomes a service bottleneck, and this disclosure is provided to address several limitations of present-day payment techniques which are most notably associated with the use of electronic devices for payment processing. Whereas in the past wait staff would provide a printed ticket to a guest and would leave the guest in solitude to judge the service, indicate a tip amount, provide comments (if any), sign the check, and leave, such solitude is not provided for when electronic devices are employed for transaction processing. Rather, a staff member presents the electronic device to the guest and then waits for the guest to enter a tip amount, feedback, and electronic signature on the device before returning it to the staff member. As one skilled in the art will also appreciate, such hovering about the service area is both awkward at best and does not provide an atmosphere that is conducive to productive feedback.

Another issue with the transfer of electronic devices to guests is cleanliness, especially during periods of disaster or pandemic. While a guest might not mind passing a credit card to a staff member for payment, he/she may be very disinclined to handle a device that may have been handled by, say, fifty previous guests.

Therefore, what is needed is a method and apparatus that enables a guest to complete a transaction in a retail establishment that does not require the guest to handle or manipulate an electronic point-of-sale terminal.

What is also needed is a technique for handing off completion of a transaction from a point-of-sale terminal to a smart device that belongs to a guest who initiated a corresponding order.

What is further needed is a system for handing off completion of a transaction from a point-of-sale terminal to a guest's smart device that is initiated by presentation of an authorization instrument other than a credit card or loyalty card.

What is moreover needed is a technique for providing a guest with an ephemeral authorization token that may be employed for a prescribed time period to authorize payment of one or more transactions and/or hand off completion of the one or more transactions from a point-of-sale terminal to a smart device that belongs to the guest.

SUMMARY OF THE INVENTION

The present invention, among other applications, is directed to solving the above-noted problems and addresses other problems, disadvantages, and limitations of the prior art by providing a superior technique for managing payments for goods and services in a retail establishment. In one embodiment, a method for handoff of a transaction for completion, the method including: registering a payment instrument with a server, associating the payment instrument with one or more indirect payment authorization tokens, and storing a payment token that associates the one or more indirect payment authorization tokens with the payment instrument in a payment token database record; storing a push notification device identifier that corresponds to the payment token in the payment token database record; via a point-of-sale (POS) terminal, entering one of the one or more indirect payment authorization tokens, and transmitting the entered one of the one or more indirect payment authorization tokens via the internet cloud to the server, where the server is not collocated with the POS terminal, and where communications between the POS terminal and the server are transmitted and received through a gateway device that is collocated with the POS terminal; via the server, using the payment token to access the push notification device identifier and transmitting a push notification to a guest device that corresponds to the push notification device identifier; upon acceptance of the push notification, executing a proprietary application on the guest device and simultaneously displaying details for the transaction on both the guest device and POS terminal; receiving transaction completion data that is entered via the guest device and transmitting the transaction completion data to the server; and completing the transaction at the server and notifying the POS terminal and the guest device that the transaction is complete.

One aspect of the present invention comprehends a computer-readable storage medium storing program instructions that, when executed by a computer, cause the computer to perform a method for handoff of a transaction for completion, the method including: registering a payment instrument with a server, associating the payment instrument with one or more indirect payment authorization tokens, and storing a payment token that associates the one or more indirect payment authorization tokens with the payment instrument in a payment token database record; storing a push notification device identifier that corresponds to the payment token in the payment token database record; via a point-of-sale (POS) terminal, entering one of the one or more indirect payment authorization tokens, and transmitting the entered one of the one or more indirect payment authorization tokens via the internet cloud to the server, where the server is not collocated with the POS terminal, and where communications between the POS terminal and the server are transmitted and received through a gateway device that is collocated with the POS terminal; via the server, using the payment token to access the push notification device identifier and transmitting a push notification to a guest device that corresponds to the push notification device identifier; upon acceptance of the push notification, executing a proprietary application on the guest device and simultaneously displaying details for the transaction on both the guest device and POS terminal; receiving transaction completion data that is entered via the guest device and transmitting the transaction completion data to the server; and completing the transaction at the server and notifying the POS terminal and the guest device that the transaction is complete.

Another aspect of the present invention envisages a system for handoff of a transaction for completion, the system including: a server, configured to receive payment instrument, and configured to store a payment token that represents the payment instrument and associate the payment instrument with one or more indirect payment authorization tokens in a payment token database record, and configured to store a push notification device identifier that corresponds to the payment token in the payment token database record; and a point-of-sale (POS) terminal, configured to enter one of the one or more indirect payment authorization tokens, and configured to transmit the one of the one or more indirect payment authorization tokens via the internet cloud to the server, where the server is not collocated with the POS terminal, and where communications between the POS terminal and the server are transmitted and received through a gateway device that is collocated with the POS terminal; where the server uses the payment token to access the push notification device identifier, and where the server transmits a push notification to the guest device; where, upon acceptance of the push notification, the guest device executes a proprietary application, and where details for the transaction are transmitted by the server for simultaneous display on both the guest device and the POS terminal; where the guest device receives transaction completion data that is entered and transmits the transaction completion data to the server; and where the server completes the transaction and notifies the POS terminal and the guest device that the transaction is complete.

BRIEF DESCRIPTION OF THE DRAWINGS

These and other objects, features, and advantages of the present invention will become better understood with regard to the following description and accompanying drawings where:

FIG. 8 is a flow diagram detailing a method for handoff of a transaction from a point-of-sale terminal to a guest device, where the handoff is triggered upon presentation of an ephemeral payment authorization token.

DETAILED DESCRIPTION

Figure 1:
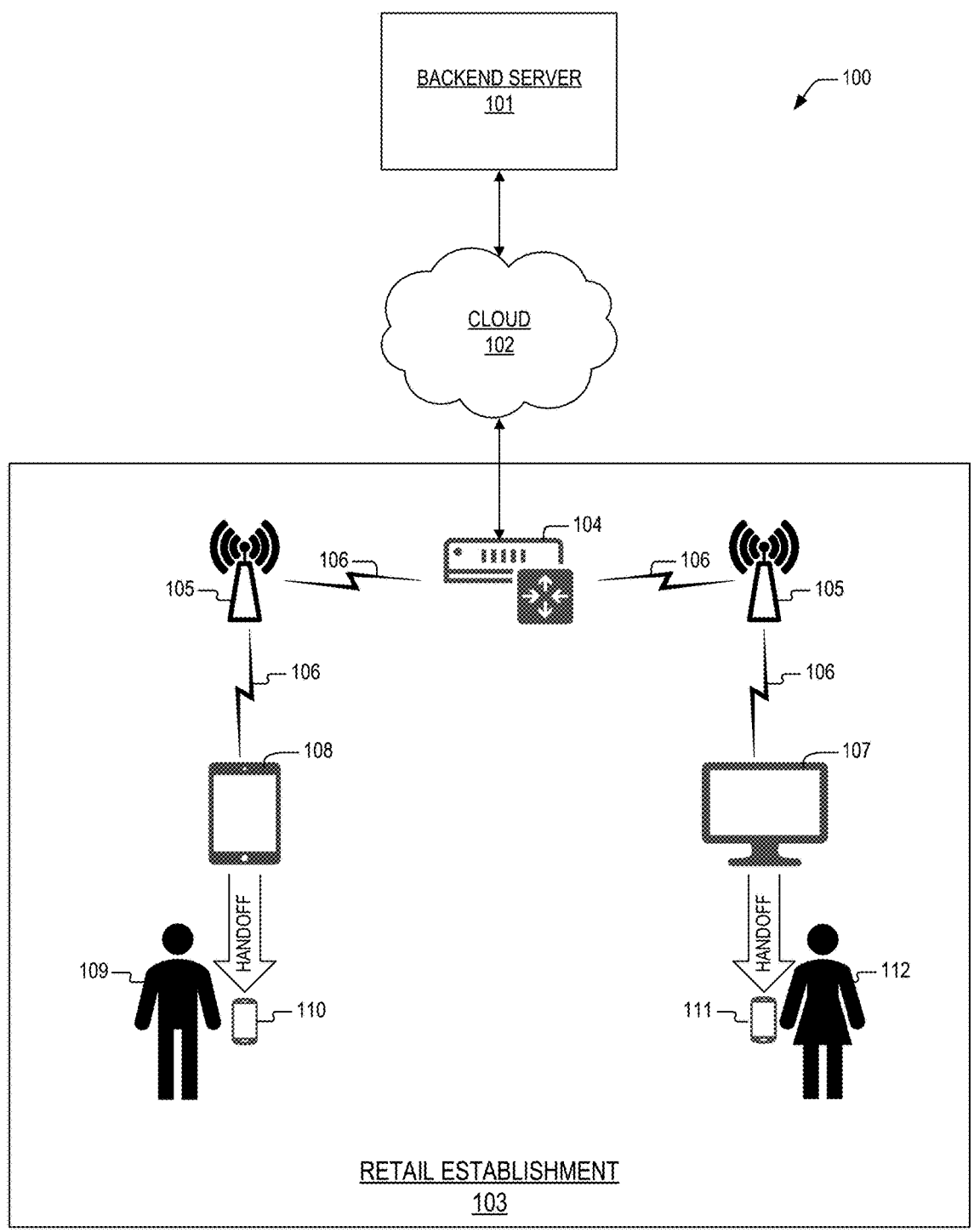
FIG. 1 is a block diagram illustrating a transaction handoff and processing system according to the present invention.

Exemplary and illustrative embodiments of the invention are described below. It should be understood at the outset that, although exemplary embodiments are illustrated in the figures and described below, the principles of the present disclosure may be implemented using any number of techniques, whether currently known or not. In the interest of clarity, not all features of an actual implementation are described in this specification, for those skilled in the art will appreciate that in the development of any such actual embodiment, numerous implementation specific decisions are made to achieve specific goals, such as compliance with system-related and business-related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. Unless otherwise specifically noted, articles depicted in the drawings are not necessarily drawn to scale.

The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans) such a special definition will be expressly set forth in the specification in a definitional manner that directly and unequivocally provides the special definition for the term or phrase. As used in this disclosure, "each" refers to each member of a set, each member of a subset, each member of a group, each member of a portion, each member of a part, etc.

Applicants note that unless the words "means for" or "step for" are explicitly used in a particular claim, it is not intended that any of the appended claims or claim elements are recited in such a manner as to invoke 35 U.S.C. § 112(f).

Definitions

Central Processing Unit (CPU): The electronic circuits (i.e., "hardware") that execute the instructions of a computer program (also known as a "computer application," "application," "application program," "app," "computer code," "code process," or "program") by performing operations on data that may include arithmetic operations, logical operations, and input/output operations. A CPU may also be referred to as a processor.

Module: As used herein, the term "module" may refer to, be part of, or include an application specific integrated circuit (ASIC), an electronic circuit, a processor (shared, dedicated, or group) and/or memory (shared, dedicated, or group) that execute one or more computer programs, a combinational logic circuit, and/or other suitable components that provide the described functionality.

In view of the above background discussion on how transactions are currently processed by electronic point of sale terminals within a retail establishment, a discussion of the present invention will be provided with reference to FIGS. 1-8. The present invention overcomes the problems associated with present-day techniques by providing methods and apparatus whereby retail establishment staff may perform a handoff of a current transaction from a point-of-sale (POS) terminal to a guest device to allow for concurrent display of the transaction on both the POS terminal and the guest device, and to allow a guest to provide a tip amount, an optional payment method, and service feedback that alerts management to problems, thus providing significant improvements in this field of technology.

Referring to FIG. 1, a block diagram is presented illustrating a transaction handoff and processing system 100 according to the present invention. The system 100 has a backend server 101 that is coupled to an internet gateway 104 that is disposed within a retail establishment 103. The backend server 101 is not disposed within the establishment 103 and may be disposed within a network operations center or other location. The backend server 101 is coupled to the gateway 104 via the internet cloud 102 using a combination of conventional wired and wireless links that allow for communications between devices over the internet cloud 102. The conventional wired links may include, but are not limited to, Ethernet, cable, fiber optic, and digital subscriber line (DSL). As part of the network path to and through the cloud 102, providers of internet connectivity (e.g., ISPs) may employ wireless technologies from point to point as well.

The gateway 104 provides for coupling of the server 101 to one or more point-of-sale (POS) terminals 107-108 via one or more access points 105. The access points 105 may be coupled to the gateway 106 via wired or wireless links 106. The wired links 106 may include, but are not limited to, Ethernet networks, local area networks, and etc. The wireless links 106 may comprise, but are not limited to, Wi-Fi, Bluetooth, near field communications, infrared links, IEEE 802.15.4, Zigbee radio links, and cellular based links (e.g., 3G, 4G, LTE, 5G), or a combination of the noted links. The POS terminals 107-108 may be configured differently to comport with intended function (e.g., seating, order entry, order fulfillment, payment processing, owner engagement, order feedback, etc.), or they may be configured similarly.

To clearly teach the present invention, two types of POS terminals 107-108 are depicted as part of the system: a fixed POS terminal 107 and a mobile POS terminal 108. The fixed terminal 107 is deemed as such because it generally is employed in a fixed location, such as to allow a guest 112 to place, pay for, and pick up orders. Though the fixed POS terminal 107 is shown in the diagram 100 as being coupled wirelessly to the gateway 104 via an access point 105, because it is employed in a fixed location it may alternatively be coupled to the gateway 104 via a wired link. The mobile POS terminal 108 may be employed by staff in multiple locations within the establishment 103 to provide services to a guest 109 that enable the guest 109 to place, pay for, and pick up orders. Though the general functions of the two POS terminals 107-108 are substantially similar, the primary difference between their mode of use is that typically a guest 112 will move to the fixed POS terminal 107 to place, pay for, and pick up orders, where the fixed POS terminal 107 may be attended by staff or may function as a self-serve stand-alone kiosk. In contrast, staff may be in possession of the mobile POS terminal 108 and may approach a guest 109 who may be seated at a bar or table, and where the staff may employ the mobile POS terminal 108 to place an order on behalf of the guest. The staff may further deliver ordered items to the guest and accept payment from the guest 109 for the ordered items.

Both of the guests 109, 112 are in possession of respective smart devices 110, 111 such as, but not limited to, Android phones, iPhones, Android tablets, iPads, and equivalent smart devices that are well known in the art. The smart devices 110, 111 may be executing a proprietary application program that corresponds to the retail establishment and that allows the guests 109, 112 to perform of one or more functions associated with processing of their orders by handing off those functions from the POS terminals 107-108 to their respective smart devices 111, 110.

As will be described in further detail below, one embodiment of the present invention contemplates a handoff from a POS terminal 107, 108 to a smart device 111, 110 that is initiated when the guest 112, 109 presents a direct or indirect payment token (e.g., a credit card, a room key, a conference badge, an employment badge, an event ticket, a transportation ticket, etc.) that has been previously registered in the system 100 as a token that the guest 112, 109 may use to authorize payment and/or handoff of one or more order transactions, where the token is presented to the system 100 via an input device that is part of the POS terminal 107-108 such as, but not limited to, a card reader (swipe, scan, or tap), a scanner, or a camera.

Another embodiment of the present invention comprehends that a handoff from a POS terminal 107, 108 to a smart device 111, 110 is initiated when the guest 112, 109 requests and receives an ephemeral payment token through executing a proprietary application program on their smart device, where the proprietary application program is configured to communicate with the system 100, and where the guest 109, 112 may subsequently employ the ephemeral token to authorize one or more transactions and/or initiate handoff of the one or more transactions to the guest's smart device 110-111. In one embodiment, the ephemeral token comprises a Quick Response (QR) code or bar code that is displayed on the smart device 110-111 and that is scanned by a scanner, where the scanner is part of the POS terminal 107-108. Other embodiments contemplate other digital images that may be input to the system 100 via a camera that is part of the POS terminal 107-108. Once a handoff to the smart device 110-111 is performed, the remainder of the transaction may be conducted by communications between the backend server 101, the smart device 110-111, and the POS terminal 107-108. In one embodiment, the remainder of the transaction may include synchronous display on the smart device 110-111 of what is being displayed on the POS terminal 107-108 (so called, "virtual guest facing display) along with entry of tip amount, payment authorization, selection of alternative payment instruments, and order feedback/comments via the smart device 110-111. In a further embodiment, the system 100 may be configured to provide alerts and action options to management of the establishment 103 when a tip falls below a configured threshold percentage and/or when negative feedback is provided via the smart device 110-111.

Advantageously, the system 100 according to the present invention provides technological improvements to this field of the art by enabling a retail establishment 103 to provide "guest facing displays" that are often mandated by state law without requiring the establishment owner to purchase additional register displays. In addition, the system 100 provides a mechanism whereby a guest 109, 112 may authorize a payment for one or more transactions, provide tip amounts, alternate payment instruments, and provide feedback on service more privately than has otherwise been heretofore provided. For some guests 109, 112 that may be disinclined to handle publicly available terminals 107-108, the system 100 according to the present invention provides for completion and payment for their orders through use of their own personal smart device 110-111. Moreover, notable transaction processing speed improvements to this field of technology are provided for by the present invention because retail staff may attend to other functions rather than waiting for a guest 109, 112 to enter data on their respective POS terminals 107-108.

Figure 2:
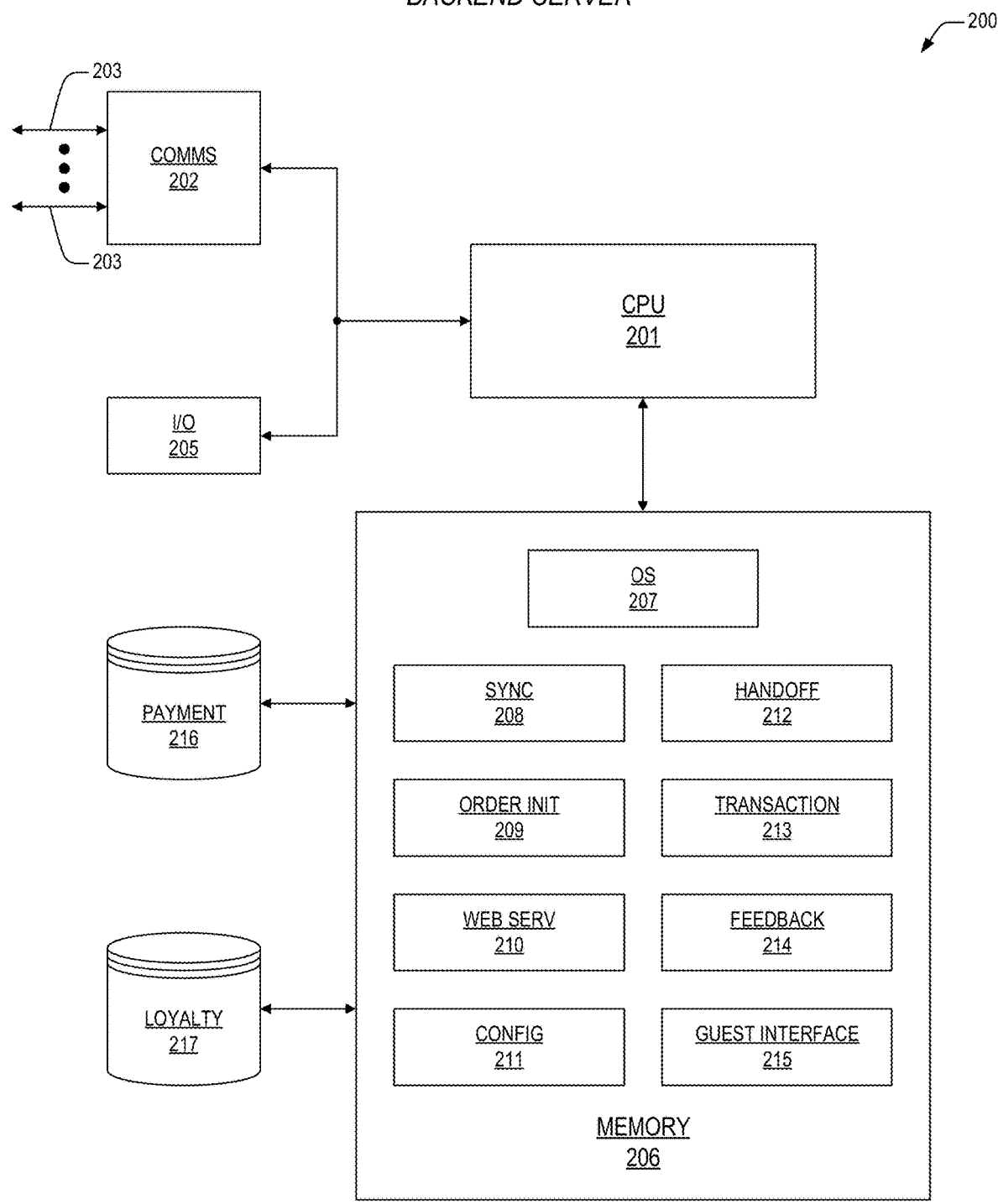
FIG. 2 is a block diagram depicting a backend server according to the present invention.

Turning now to FIG. 2, a block diagram is presented depicting a backend server 200 according to the present invention, such as the backend server 101 of FIG. 1. The backend server 200 may be embodied as a central processing unit (CPU) 201 that is coupled to a memory 206 having both transitory and non-transitory memory components therein. The CPU 201 is also coupled to a communications circuit 202 that coupled the backend server 200 to the internet cloud via one or more wired and/or wireless links 203 as are discussed above. The backend server 200 may also comprise input/output circuits 205 that include, but are not limited to, data entry and display devices (e.g., keyboards, monitors, touchpads, etc.). The memory 206 may be coupled to a payment token database 216 and to a loyalty token database 217. In one embodiment, the payment token database 216 and loyalty token database 217 are disposed in the same location as the memory 206. In another embodiment, the payment token database 216 and loyalty token database 217 are not disposed in the same location as the memory 206 and are accessed via messages transmitted and received over the links 203 rather than by direct connection as shown in the diagram.

The memory 206 may include an operating system 207 such as, but not limited to, Microsoft Windows, Mac OS, Unix, and Linux, where the operating system 207 is configured to manage execution by the CPU 201 of program instructions that are part of components of one or more application programs. In one embodiment, a single application program comprises a plurality of modules (or "code segments") 208-215 resident in the memory 206 and identified as a synchronization process (SYNC) 208, an order initiation process (ORDER INIT) 209, a web services process (WEB SERV) 210, a configuration process (CONFIG) 211, a handoff process (HANDOFF) 212, a transaction process (TRANSACTION) 213, a feedback process (FEEDBACK) 214, and a guest interface process (GUEST INTERFACE) 215.

Operationally, the backend server 200 may execute one or more of the code segments 208-215 as required to enable POS terminals in a retail establishment to initiate orders on behalf of guests, to synchronize an order taken by one POS terminal with other POS terminals in the establishment, to receive requests from proprietary applications executing on guest smart devices for ephemeral payment tokens, to transmit those ephemeral tokens (also called payment nonces) to the guest devices, to route orders for processing and fulfillment, to process payments authorized by presentation of ephemeral tokens presented via guest devices, to process payments authorized by presentation of credit cards or indirect authorization tokens (e.g., loyalty card, room key, ID badge, event ticket, transportation ticket, etc.) that has been previously registered, to perform handoff of a transaction to a guest device, to simultaneously transmit POS display data to the guest device, to receive data provided by the guest device for transaction completion and feedback, and to transmit negative feedback and actions to designated POS terminals in the establishment for prompt management attention.

The payment token database 216 comprises a plurality of payment records that each link a one or more payment tokens to a particular smart device, where the smart device has been employed via a proprietary application executing thereon to register guest information and one or more payment instruments with the establishment. The guest information may comprise credit card numbers and guest name. The guest information may further comprise indirect payment authorization mechanisms such as, but not limited to, room key number, identification badge number, event ticket number, airline ticket number, train ticket number, metro ticket number, and cruise ticket number. The guest information may further comprise an ephemeral transaction authorization token that has been transmitted to a guest's smart device. Once registered, the guest information is encoded into a payment record comprising unique and secure payment tokens that each correspond to an ephemeral transaction authorization token along with each of the indirect payment authorization mechanisms, and that are mapped to one of the registered payment instruments along with an identifier for the linked smart device. Accordingly, when a guest at the establishment provides a payment instrument that comprises the credit card number, one of the indirect payment authorization mechanisms, or the ephemeral token, a corresponding payment token is retrieved from the payment token database 216 along with an identifier for a corresponding smart device. In one embodiment, a single payment token may be linked to more than one smart device, e.g., a smart phone and smart tablet. In one embodiment, when a guest employs the proprietary application to register, push notifications may also be enabled as part of the registration process, thus enabling the backend server 200 to send push notifications to a linked smart device. The payment tokens are intended to link direct payment mechanisms (credit cards), indirect payment authorization instruments as noted above, and ephemeral transaction authorization codes to one of the registered payment instruments and to one or more smart devices. Accordingly, a guest may register their personal credit card and name, a cruise ticket, a work ID badge, etc., and associated those direct and indirect payment mechanisms with the personal credit card payment instrument. In addition, guest may register a company credit card payment instrument and associate that instrument with a conference ID badge, an airline ticket, etc.

The loyalty token database 217 comprises a plurality of loyalty records that each link a loyalty account identifier ("loyalty token") to one or more fields of contact information for a guest who has created a loyalty account with the establishment either via a web browser coupled to the backend server 200 or directly from the proprietary application executing on their smart device. The loyalty records may include one or more of the following fields: smart device identification, guest name, guest email address, guest number for text messages, and other identifiers for direct messaging (e.g., Facebook Messenger). In one embodiment, during registration a guest may opt to allow push notifications to their smart device from the backend server 200.

Accordingly, when a guest at the establishment employs the proprietary application on their smart device to request and accept an ephemeral transaction token or presents one of the registered direct or indirect payment authorization mechanisms, the loyalty token is retrieved from the loyalty token database 217 along with an identifier for the smart device, thus enabling push notifications to be transmitted to the smart device that may include simultaneous display of transaction information on both the POS terminal and the smart device, options for tip and modification of payment instrument, and feedback on service. For guests that have not enabled push notifications, no unique device identifier is registered in the loyalty database 217; however, one or more of the other contact fields (e.g., email, text message number, etc.) may be employed by the backend server 200 to transmit a browser link to the guest via a corresponding transmission medium (e.g., email, SMS message, Facebook message, etc.). Upon selection of the browser link on a smart device, the smart device's browser is redirected to a web page generated by the guest interface component 215 within the backend server that enables the guest to perform the same functions as discussed above to monitor and complete the transaction, yet from within a browser environment rather than the proprietary application. Further details of each of the code segments 208-215 will be discussed below.

Figure 3:
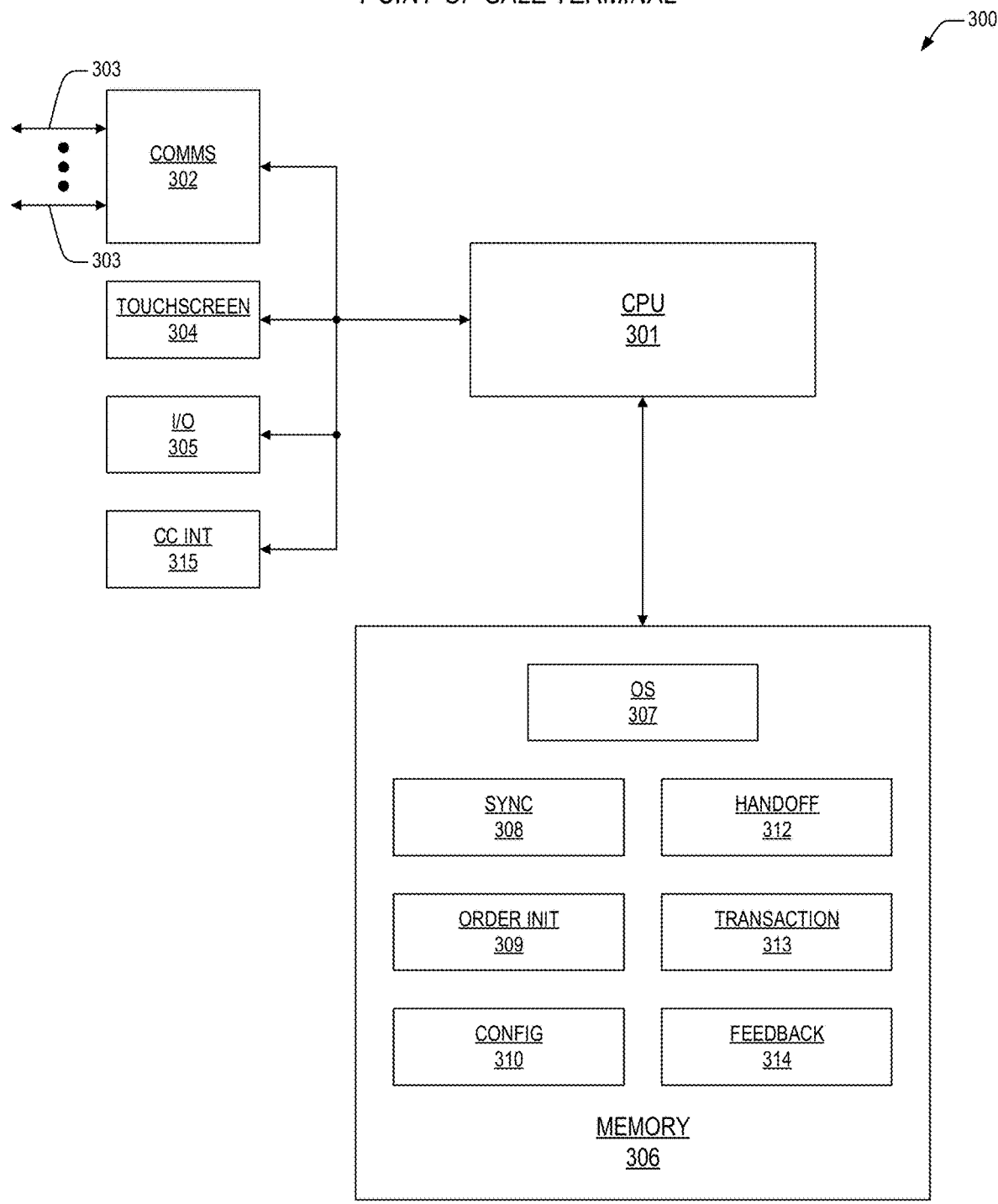
FIG. 3 is a block diagram featuring a point-of-sale terminal according to the present invention.

Now referring to FIG. 3, a block diagram is presented featuring a point-of-sale terminal 300 according to the present invention. The terminal 300 may be embodied as either a fixed terminal 107 or a mobile terminal 108 as is discussed above with reference to FIG. 1, the differences being generally size of the terminal 300 and connection (wired or wireless) to the gateway 104. Generally, a fixed terminal 107 is larger in size than a mobile terminal 108 and the mobile terminal 108 is sized so that it can be easily carried by wait staff.

The terminal 300 may be embodied as a central processing unit (CPU) 301 that is coupled to a memory 306 having both transitory and non-transitory memory components therein. The CPU 301 is also coupled to a communications circuit 302 that couples the terminal 300 to a gateway 104 within the establishment via one or more wired and/or wireless links 303 as are discussed above. Through these links 303, the terminal 300 along with other terminals in the establishment may directly communicated with the backend server 200. No on-premise local server is required to perform any point-of-sale function within the establishment as all synchronization functions are performed through messages exchanged between the backend server 200 and the terminal 300. The terminal 300 may comprise a touchscreen 304 that allows for order entry, display of menu items, and related functions. The terminal 300 may also comprise input/output circuits 205 that include, but are not limited to, data entry and display devices (e.g., keyboards, monitors, touchpads, scanners, cameras, printers, etc.). The terminal 300 may further comprise a card entry interface 315 that staff may employ to enter direct or indirect payment authorization mechanisms data into the system. In one embodiment, the interface 315 comprises a conventional card reader that may provide for entry of card data via magnetic strip swipe, EMV chip reading ("dip"), or reading of encoded data via near field communications ("tap"). The interface 315 may be capable of one or more of the aforementioned mechanisms for reading card data. In one embodiment, the credit card interface 315 may be integrated into the same housing as the touchscreen 304. In one embodiment, the input/output circuits may be employed to identify indirect transaction authorization mechanisms that are not readable by the card reader 315.

The memory 306 may include an operating system 307 such as, but not limited to, Microsoft Windows, Mac OS, Unix, and Linux, where the operating system 307 is configured to manage execution by the CPU 301 of program instructions that are part of components of one or more application programs. In one embodiment, a single application program comprises a plurality of code segments 308-310, 312-314 resident in the memory 306 and identified as a synchronization process (SYNC) 308, an order initiation process (ORDER INIT) 309, a configuration process (CONFIG) 310, a handoff process (HANDOFF) 312, a transaction process (TRANSACTION) 313, and a feedback process (FEEDBACK) 314. Other code segments (not shown) may be provided to perform other point-of-sale functions by the terminal 300 (e.g., printing of receipts, entry of gift cards, etc.) which are not discussed herein in order to clearly teach aspects of the present invention.

Operationally, the terminal 300 may execute one or more of the code segments 208-215 as required to enable guests or staff in a retail establishment to initiate orders; to communicate orders to the backend server; to receive communications from the backend server that synchronize an order taken by one POS terminal 300 with other POS terminals 300 in the establishment; to scan ephemeral tokens presented on guest devices, to input direct and indirect payment authorization mechanisms; to communicate ephemeral, direct, and indirect payment authorization mechanisms to the backend server; to provide for entry of tip amounts and order feedback from guests; to coordinate handoff of a corresponding transaction to a guest device with the backend server; and to receive communications from the backend server indicating completion of the transaction.

The configuration process 310 may be employed upon power up of the terminal 300 to configure the terminal 300 for a specific function such as a seating terminal, a self-serve kiosk, an order processing/fulfillment terminal, an expediter terminal, or a management feedback and action terminal.

Operationally, the order initiation process 309 may execute to allow for display and entry of a guest order. As the order is entered, it is transmitted to the backend server via messages over the links 303. The synchronization process 308 is executed to and works in conjunction with the synchronization process 208 in the back end server maintain persistent and durable states of all orders within the establishment, even though those orders may have been entered on other terminals 300. Advantageously, this allows any terminal 300 within the establishment to modify and close out an existing order. In addition, this synchronization enables multiple terminals 300 to be employed to process a single order, say for a table of 20 guests, thus significantly reducing the time required to enter and fulfill orders, which comprises a remarkable improvement in transaction processing technology.

To close out an order, the transaction process 313 may be executed to provide for display of order details and subtotals, and to provide for entry of an ephemeral token, direct payment authorization mechanism, or an indirect payment authorization mechanism by a guest. If the mechanism is an ephemeral token that has not timed out, then the ephemeral token is scanned by the input/output circuits 305 and transmitted via the links 303 to the transaction process 213 within the backend server 200. If the mechanism is a card-readable indirect payment authorization mechanism, then the card-readable indirect payment authorization mechanism is entered via the card interface 315 and transmitted via the links 303 to the transaction process 213 within the backend server 200. If the mechanism is an indirect payment authorization mechanism that is other than card-readable, then the indirect payment authorization mechanism is captured via the input/output circuits 305 and transmitted via the links 303 to the transaction process 213 within the backend server 200.

In turn, the backend server 200 may then access the payment token database 216 to obtain a payment token that links the provided payment authorization token to a registered payment instrument and a linked smart device. If enabled, the backend server 200 then transmits a push notification to the smart device(s) associated with the smart device identifier that notifies the guest that the transaction can be completed on their smart device. If accepted, then the backend server executes that handoff process 212 which notifies the handoff process 312 in the terminal 300 that the transaction is being completed via the guest's smart device and also executes the guest interface process 215 to format and transmit content to the guest device that shows details necessary to complete the transaction (e.g., ordered items, subtotal, tax, tip entry field, signature field, etc.). At this point, the terminal 300 is essentially free to be used for other purposes because communications to complete the transaction are now between the guest's smart device and the backend server 200. The guest interface process 215 may also be employed to receive data entered by the guest such as tip amount, signature, and feedback on the order. All of the data displayed and entered on the guest's smart device occurs while running the proprietary application program linked to the establishment. Therein, in one embodiment, the guest may change payment instruments to any instrument (e.g., gift card, PayPal, Apple Wallet) that may be registered with the system. In one embodiment, the system may treat a registered loyalty card in exactly the same manner as a credit card for purposes of handoff and selection of payment instrument within the proprietary application program.

In the above embodiments, presentation of a requested and received ephemeral payment authorization token, a registered direct payment authorization token, or a registered indirect payment authorization token is what initiates a handoff from the terminal 300 to a proprietary application program executing on a corresponding guest smart device. For smart devices that have not enabled push notifications, handoff is perfected by transmission of a message in one or more of the registered loyalty information fields (number for text messages, email address, etc.) that directs the guest to execute the proprietary application program on their smart device or to launch a browser window on the guest's smart device and performing the functions described above to complete the transaction. Control of content of the browser window is performed by execution of the web services process 210 within the backend server 200. This browser-based handoff embodiment is utilized when a guest does not have the proprietary application installed on their smart device or chooses to complete the transaction via a web browser.

As noted above, a guest may have the proprietary application installed on their smart device but may have not enabled push notifications. However, if a suitable form of contact information is linked within the loyalty database 217, the backend server 200 may employ an alternative communication method to send a link to other applications executing on the guest's smart device such as, but not limited to, email, SMS messaging, and Facebook Messenger. When the guest accepts the link, the proprietary application is launched, and transaction handoff is performed as discussed above. If the proprietary application is not installed on the guest device, when the guest accepts the link, a browser-based handoff is performed for completion of the transaction.

Preferably, the ephemeral transaction authorization token comprises a QR code that may be read by a conventional QR code reader executing on the POS terminal 300. Another embodiment contemplates a bar code that is read by a conventional bar code reader on the POS terminal 300. In one embodiment, the ephemeral transaction authorization token is unique and may be employed for a prescribed period of time by a guest to authorize one or more transactions and to initiate handoffs within the retail establishment. In a restaurant embodiment, prescribed period of time may comprise 2 hours. In a bar embodiment, the prescribed period of time may comprise 3 hours. In a conference embodiment, the prescribed period of time may comprise duration of a corresponding conference. In an employer embodiment, the prescribed period of time may comprise one month. In an airline ticket embodiment, the prescribed period of time may comprise duration of a corresponding flight. Other embodiments are contemplated to comport with associated objectives.

Figure 4:
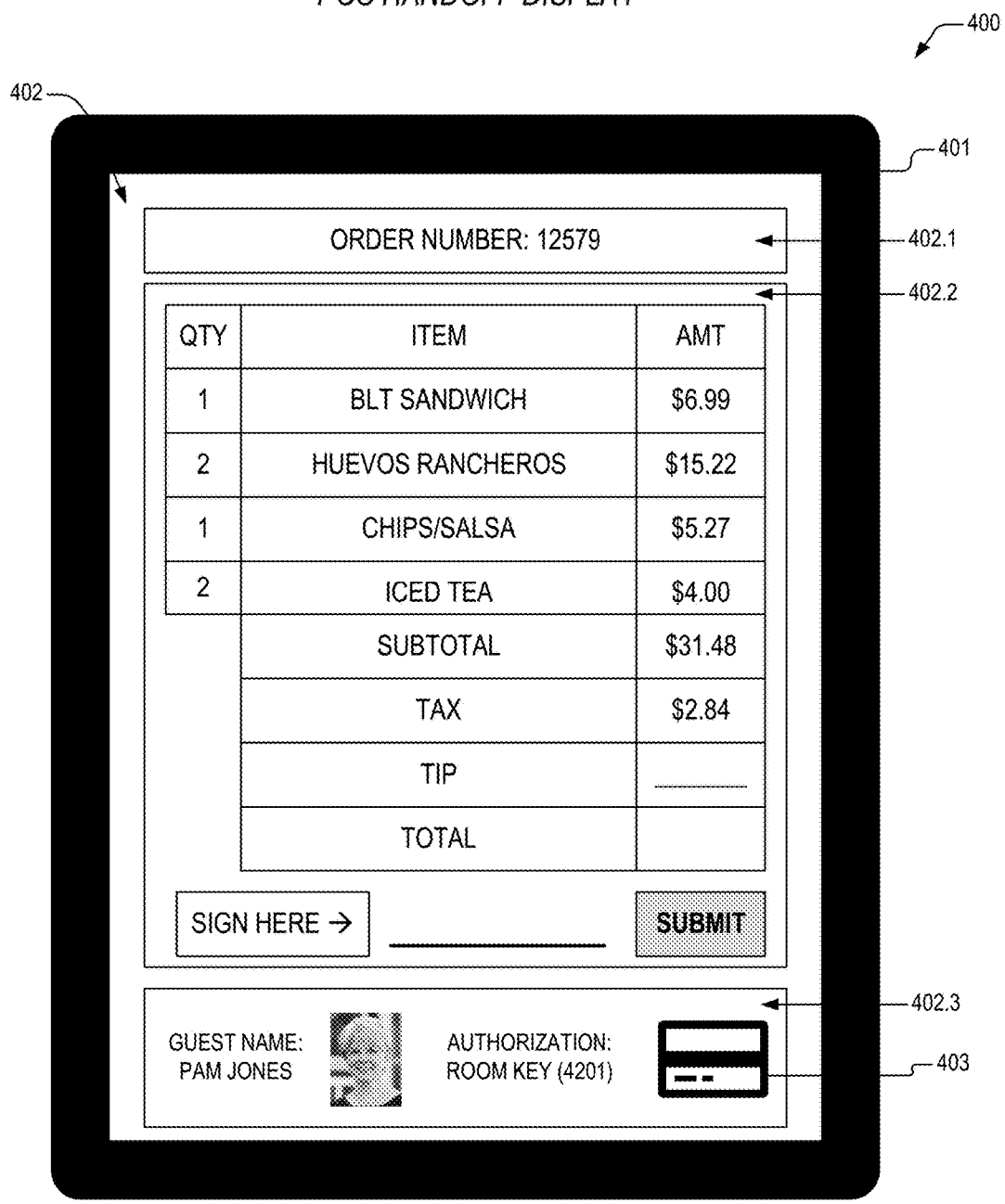
FIG. 4 is a diagram showing an exemplary handoff display on a point-of-sale terminal that employs an indirect payment authorization token.

Now turning to FIG. 4, a diagram is presented showing an exemplary handoff display on a point-of-sale terminal 400. The terminal 400 may comprise a housing 401 and touchscreen display 402 such as an iPad or Android tablet. The display 402 may comprise an order number area 402.1 that displays an identifier ("12579") for a transaction. The display 402 may additionally comprise a transaction details area 402.2 that displays items corresponding to the transaction identifier, quantity ordered, price of the items, along with a subtotal amount and entry areas for tip and guest authorization signature. Upon entry of a tip amount by a guest or wait staff, the terminal 400 may calculate the total.

The display 402 also has a transaction authorization token display area 402.3 that shows a representation of a transaction authorization token 403 (ephemeral, direct, or indirect) corresponding to the transaction identifier that has been presented by the guest for authorization of a transaction associated with the transaction identifier. In the example shown, the transaction authorization token comprises a room key that has been input to the system via the POS terminal 300. The transaction authorization token display area 402.3 may further comprise identifying information for the guest including guest name and guest photo. Upon entry of the transaction authorization token, the terminal 400 transmits the transaction authorization token to the backend server 200 and the backend server transmits the information displayed in the transaction authorization token display area 402.3 to the POS terminal 300, and the backend server 200 then operates to transmit a version of the transaction details area 402.2 to the guest's smart device that is formatted for display thereon, either within the proprietary application executing on the guest's smart device or within a web browser on the guest's device.

The present invention also comprehends handoff of other items for display and data entry on the guest's smart device such as, but not limited to, feedback scoring and comments on the order by the guest. In one embodiment, feedback scoring may be simply a "thumbs up" or "thumbs down" selection by the guest. In another embodiment, a star rating scale may be presented.

Figure 5:
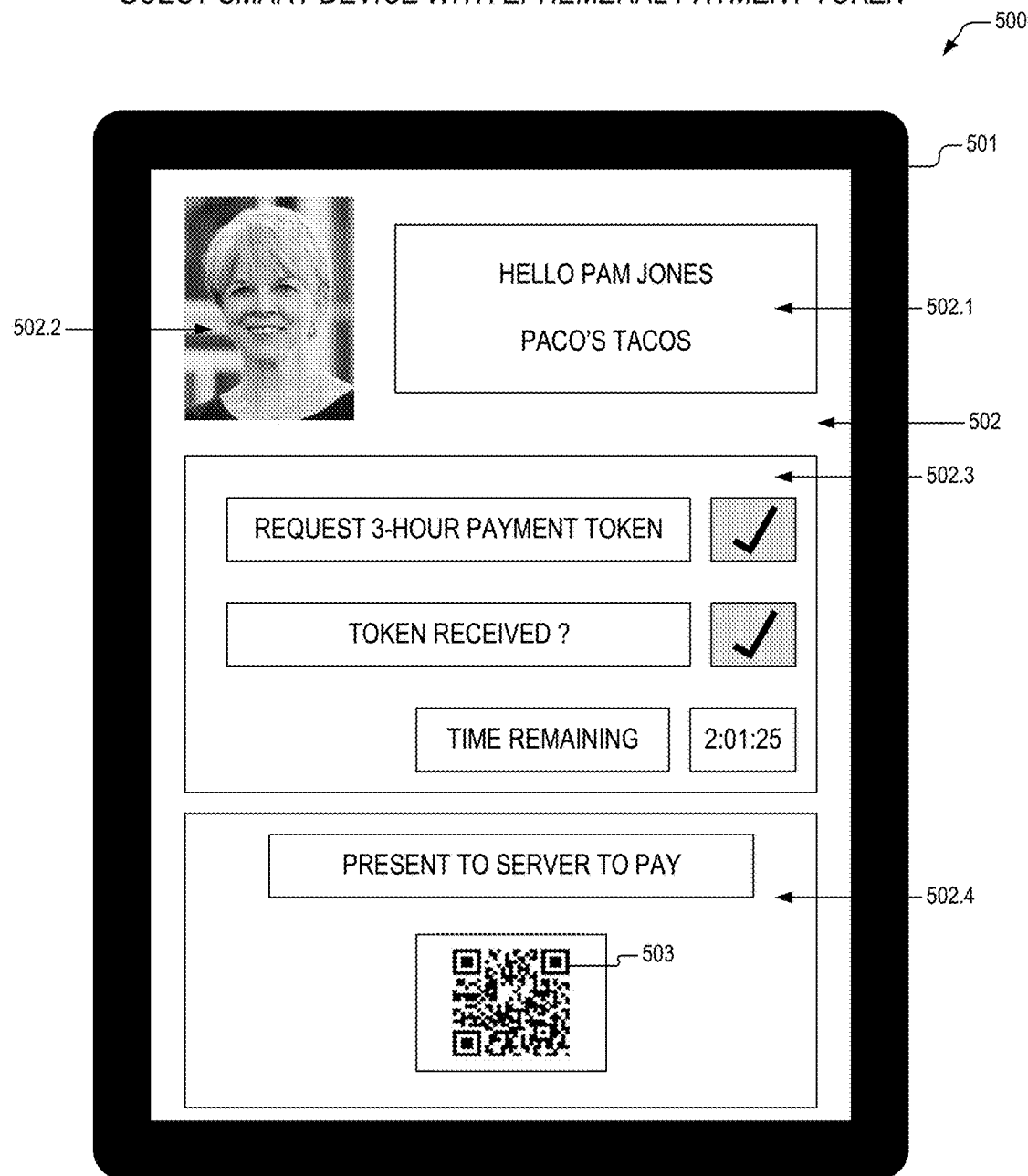
FIG. 5 is a client application display on a guest smart device showing an ephemeral payment authorization token that may initiate a handoff of a transaction from a point-of-sale terminal to the guest smart device.

Referring now to FIG. 5, a diagram 500 is presented showing an exemplary client application display 502 generated by a proprietary application executing on a guest smart device that depicts an ephemeral payment authorization token 503 that may initiate a handoff of a transaction from a point-of-sale terminal to the guest smart device 501. The smart device may comprise a housing 501 and the touchscreen display 502. The display 502 may comprise a greeting area 502.1 that displays a retail establishment name ("Paco's Tacos") along with a greeting ("Hello Pam Jones") for a guest that is registered in the system and that is associated with the guest smart device. The display 502 may additionally comprise guest identification area 502.2 that displays a photo of the guest. The display 502 may further comprise a token exchange area 502 that enables the guest to request an ephemeral transaction authorization token (along with an icon showing status of the request, to indicate status of token reception, and that further shows time remaining in a prescribed time period which the guest may employ the token to authorize one or more transactions within the retail establishment. In the exemplary display 502, the prescribed time period is 3 hours and the time remaining is 2 hours, 1 minute, and 25 seconds. The display 502 also has an ephemeral transaction authorization token display area 502.3 that shows the ephemeral transaction authorization token 503 that has been requested and received from the backend server 200. Accordingly, the guest may present the display that includes the token 503 to a POS terminal 300 within the retail establishment to authorize payment of one or more transactions until the prescribed time period expires. Upon expiration of the prescribed time period, the backend server 200 directs the proprietary application to delete the ephemeral transaction authorization token 503.

Figure 6:
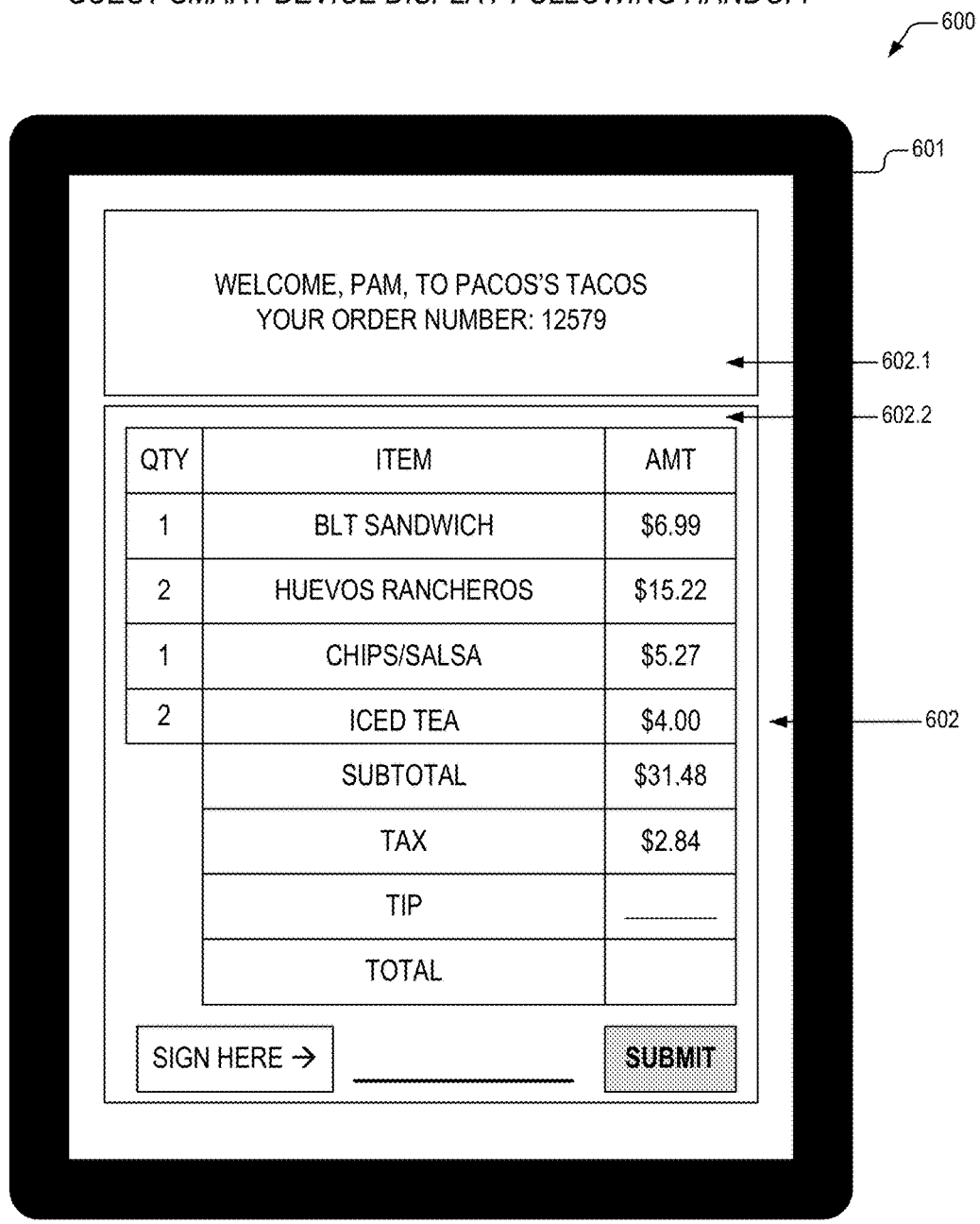
FIG. 6 is a client application display on a guest smart device showing details corresponding to the transaction of FIG. 5.
Figure 7:
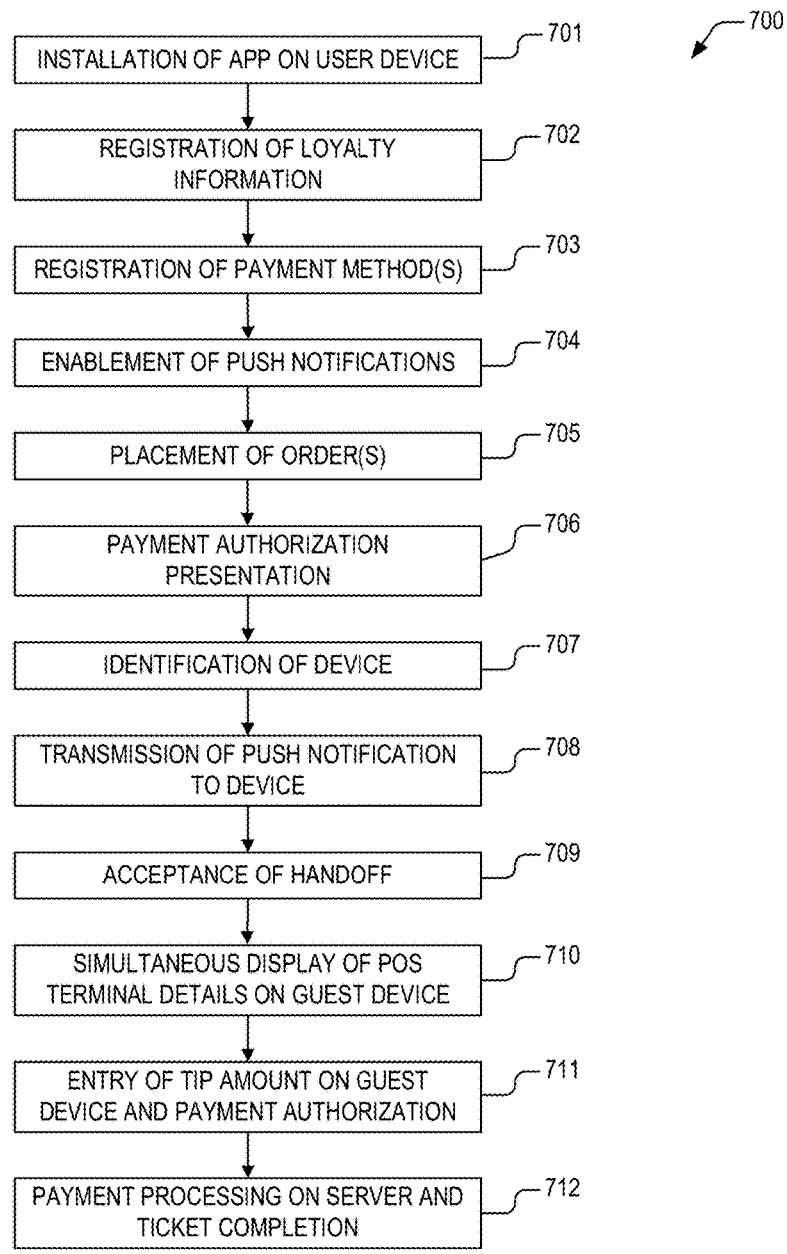
FIG. 7 is a flow diagram detailing a method for handoff of a transaction from a point-of-sale terminal to a guest device, where the handoff is triggered upon entry of credit card payment data or an indirect payment authorization token.

Turning to FIG. 6, a diagram 600 is presented showing an exemplary display 602 generated by a proprietary application program executing on a guest device that depicts details corresponding to the transaction authorized by presentation of the ephemeral transaction authorization token 503 of FIG. 5 to a POS terminal 200, where the backend server 300 has transmitted a virtual guest facing display of the transaction to the guest smart device. The smart device may comprise a housing 601 and the touchscreen display 602. The display 602 may comprise an order identification area 602.1 that identifies the retail establishment, the guest, and a transaction identifier ("order number"). The display 602 may additionally comprise a transaction details area 602.2 that is substantially similar to the transaction details area 402.2 on the POS display 402 of FIG. 4, and that displays items corresponding to the transaction identifier, quantity ordered, price of the items, along with a subtotal amount and entry areas for tip and guest authorization signature Referring now to FIG. 7, a flow diagram 700 is presented detailing a method for handoff of a transaction from a point-of-sale terminal to a guest device, where the handoff is triggered upon entry of a direct (e.g., credit card) or indirect (e.g., room key, etc.) transaction authorization mechanism. Flow begins at block 701 when a guest downloads and installs a proprietary application corresponding to a retail establishment on a smart device that belongs to the guest. Flow then proceeds to block 602.

At block 702, the guest executes that proprietary application on the smart device and the application prompts the guest to enter registration information such as, but not limited to, name, email address, phone number for text messaging, and other forms of contact information (e.g., Facebook Messenger address). The registration information is then transmitted by the proprietary application through the cloud to the backend server 200, which creates a loyalty token for the guest and stores a corresponding loyalty record in the loyalty database 217. Flow then proceeds to block 603.

At block 703, the guest is prompted by the proprietary application to enter one or more payment instruments such as a credit card number or gift card number and one or more direct or indirect transaction authorization mechanisms as disclosed above. The guest may further associate each of the entered transaction authorization mechanisms with a corresponding one of the entered payment instruments. The payment instruments, transaction authorization mechanisms, and their associations are then transmitted by the proprietary application through the cloud to the backend server 200, which creates one or more corresponding payment tokens for the guest and stores the payment tokens in corresponding payment token records in the payment database 216. Flow then proceeds to block 704.

At block 704, the guest is prompted by the proprietary application to enable push notifications to the guest's smart device. Acceptance of enablement is transmitted by the proprietary application through the cloud to the backend server 200, which updates the previously created payment token records in the payment database 216 with the unique device identifier for pushing notifications to the guest's smart device. Flow then proceeds to block 705.

At block 705, the guest may place an order for goods either through the proprietary application, via a web page maintained by the web services component 210, within the retail establishment on a self-service kiosk 300, via a third-party application (e.g., Door Dash or Grubhub) that is coupled to the backend server 200, or staff at the establishment may enter the order directly via the touchscreen 304 into a fixed or mobile point-of-sale terminal 300. If entered on a terminal 300, the order initiation component 309 creates an order number and communicates details of the order to the backend server 200. The synchronization component 208 then transmits the order number and details of the order to remaining terminals 300 in the establishment. If entered through the proprietary application or a third-party application, then the order initiation component 209 in the backend server creates an order number along with details of the order and then transmits the order number and details of the order to terminals 300 in the establishment. Flow then proceeds to block 706.

At block 706, following fulfillment of the placed order, the guest presents a direct or indirect transaction authorization mechanism that is input (scanned, photographed, etc.) by a POS terminal within the establishment. Encoded information from the direct or indirect transaction authorization mechanism is then transmitted by the transaction component 313 in the terminal 300 to the transaction component 213 in the backend server. Flow then proceeds to block 707.

At block 707, the handoff component 212 in the server 200 employs the encoded information to access a corresponding record in the payment token database 216 that designates a corresponding push notification device identifier. Flow then proceeds to block 708.

At block 708, the handoff component 212 then employs the identifier to send content to the guest's smart device requesting handoff of the transaction to the guest device. Flow then proceeds to block 709.

At block 709, the guest accepts handoff by selecting the push notification, which wakes up the proprietary application for execution on the guest device. The proprietary application then notifies the handoff component 212 that handoff has been accepted. Flow then proceeds to block 710.

At block 710, the handoff component 212 passes control to the guest interface component 215 that transmits content of the transaction, exemplified in the diagram 400 of FIG. 4, that is formatted for display on the guest device within the proprietary application, as is shown in the diagram 600 of FIG. 6. Thus, the terminal 300 may subsequently be employed to process other orders. Flow then proceeds to block 711.

At block 711, the guest enters a tip amount and payment authorization (e.g., signature and submission), which is communicated by the proprietary application to the backend server 200. Flow then proceeds to block 712.

At block 712, the transaction component 213 processes the payment using the payment instrument retrieved from the payment token database 216 and messages terminals 300 in the establishment and the proprietary application that payment of the ticket is complete. The transaction component 213 may also transmit an electronic receipt to the proprietary application as a record of the transaction. The receipt may optionally be stored within the proprietary application for reference. The proprietary application may further provide for export of the receipt. The receipt may optionally be stored within the proprietary application for reference. The proprietary application may further provide for export of the receipt.

While the method completes at block 712, the guest interface component 215 may further generate and transmit content to the guest device that allows the guest to provide feedback on the order, as is discussed above. The feedback is then transmitted by the proprietary application to the feedback component 214 of the backend server 200, which determines according to programmed criteria if management attention to the order is warranted. The feedback component 214 additionally may access the tip amount entered by the guest and determine if a tip percentage is above or below a threshold that is programmed into the system by management. The feedback, indication of acceptable tip percentage, and any notes provided by the guest are then transmitted by the feedback component 214 to a feedback component 314 in a terminal 300 in the establishment that is configured for management access as described above. Accordingly, a management representative is immediately alerted to guest dissatisfaction and is provided with options similar to those described with reference to FIG. 5 that may assuage the guest and secure continuing loyalty. Accordingly, the management representative selects one of the actions or may take another action to address service concerns that were identified by the guest.

Finally referring to FIG. 8, a flow diagram 800 is presented detailing a method for handoff of a transaction from a point-of-sale terminal to a guest device, where the handoff is triggered upon presentation of an ephemeral payment authorization token. Flow begins at block 801 when a guest downloads and installs a proprietary application corresponding to a retail establishment on a smart device that belongs to the guest. Flow then proceeds to block 802.

At block 802, the guest executes that proprietary application on the smart device and the application prompts the guest to enter registration information such as, but not limited to, name, email address, phone number for text messaging, and other forms of contact information (e.g., Facebook Messenger address). The registration information is then transmitted by the proprietary application through the cloud to the backend server 200, which creates a loyalty token for the guest and stores a corresponding loyalty record in the loyalty database 217. Flow then proceeds to block 603.

At block 803, the guest is prompted by the proprietary application to enter one or more payment instruments such as a credit card number or gift card number and one or more direct or indirect transaction authorization mechanisms as disclosed above. The guest may further be prompted to associated one of the one or more payment instruments with ephemeral transaction authorization codes that may be requested and received for transactions. The guest may further associate each of the entered transaction authorization mechanisms with a corresponding one of the entered payment instruments. The payment instruments, transaction authorization mechanisms, and their associations are then transmitted by the proprietary application through the cloud to the backend server 200, which creates one or more corresponding payment tokens for the guest and stores the payment tokens in corresponding payment token records in the payment database 216. Flow then proceeds to block 804.

At block 804, the guest is prompted by the proprietary application to enable push notifications to the guest's smart device. Acceptance of enablement is transmitted by the proprietary application through the cloud to the backend server 200, which updates the previously created payment token records in the payment database 216 with the unique device identifier for pushing notifications to the guest's smart device. Flow then proceeds to block 805.

At block 805, the guest may launch the proprietary application program and request/receive an ephemeral transaction token that may be employed for a prescribed period of time to authorize one or more transactions within a retail establishment. Flow then proceeds to block 806.

At block 805, the guest may place an order for goods either through the proprietary application, via a web page maintained by the web services component 210, within the retail establishment on a self-service kiosk 300, via a third-party application (e.g., Door Dash or Grubhub) that is coupled to the backend server 200, or staff at the establishment may enter the order directly via the touchscreen 304 into a fixed or mobile point-of-sale terminal 300. If entered on a terminal 300, the order initiation component 309 creates an order number and communicates details of the order to the backend server 200. The synchronization component 208 then transmits the order number and details of the order to remaining terminals 300 in the establishment. If entered through the proprietary application or a third-party application, then the order initiation component 209 in the backend server creates an order number along with details of the order and then transmits the order number and details of the order to terminals 300 in the establishment. Flow then proceeds to block 807.

At block 807, following fulfillment of the placed order, the guest presents the received ephemeral transaction authorization token that is input (scanned, photographed, etc.) by a POS terminal within the establishment. Encoded information ephemeral transaction authorization token is then transmitted by the transaction component 313 in the terminal 300 to the transaction component 213 in the backend server. Flow then proceeds to block 808.

At block 808, the handoff component 212 in the server 200 employs the encoded information to access a corresponding record in the payment token database 216 that designates a corresponding push notification device identifier. Flow then proceeds to block 809.

At block 809, the handoff component 212 then employs the identifier to send content to the guest's smart device requesting handoff of the transaction to the guest device. Flow then proceeds to block 810.

At block 810, the guest accepts handoff by selecting the push notification, which wakes up the proprietary application for execution on the guest device. The proprietary application then notifies the handoff component 212 that handoff has been accepted. Flow then proceeds to block 811.

At block 811, the handoff component 212 passes control to the guest interface component 215 that transmits content of the transaction, exemplified in the diagram 400 of FIG. 4, that is formatted for display on the guest device within the proprietary application, as is shown in the diagram 600 of FIG. 6. Thus, the terminal 300 may subsequently be employed to process other orders. Flow then proceeds to block 812.

At block 812, the guest enters a tip amount and payment authorization (e.g., signature and submission), which is communicated by the proprietary application to the backend server 200. Flow then proceeds to block 813.

At block 813, the transaction component 213 processes the payment using the payment instrument retrieved from the payment token database 216 and messages terminals 300 in the establishment and the proprietary application that payment of the ticket is complete. The transaction component 213 may also transmit an electronic receipt to the proprietary application as a record of the transaction. The receipt may optionally be stored within the proprietary application for reference. The proprietary application may further provide for export of the receipt. The receipt may optionally be stored within the proprietary application for reference. The proprietary application may further provide for export of the receipt.

While the method completes at block 813, the guest interface component 215 may further generate and transmit content to the guest device that allows the guest to provide feedback on the order, as is discussed above. The feedback is then transmitted by the proprietary application to the feedback component 214 of the backend server 200, which determines according to programmed criteria if management attention to the order is warranted. The feedback component 214 additionally may access the tip amount entered by the guest and determine if a tip percentage is above or below a threshold that is programmed into the system by management. The feedback, indication of acceptable tip percentage, and any notes provided by the guest are then transmitted by the feedback component 214 to a feedback component 314 in a terminal 300 in the establishment that is configured for management access as described above. Accordingly, a management representative is immediately alerted to guest dissatisfaction and is provided with options similar to those described with reference to FIG. 5 that may assuage the guest and secure continuing loyalty. Accordingly, the management representative selects one of the actions or may take another action to address service concerns that were identified by the guest.

Portions of the present invention and corresponding detailed description are presented in terms of software or algorithms, and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The invention is not limited by these aspects of any given implementation.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims. For example, components/elements of the systems and/or apparatuses may be integrated or separated. In addition, the operation of the systems and apparatuses disclosed herein may be performed by more, fewer, or other components and the methods described may include more, fewer, or other steps. Additionally, unless otherwise specified steps may be performed in any suitable order.

Although specific advantages have been enumerated above, various embodiments may include some, none, or all of the enumerated advantages.

What is claimed is:

1. A method for handoff of a transaction for completion, the method comprising:

registering a payment instrument with a server, associating the payment instrument with one or more indirect payment authorization tokens, and storing a payment token that associates the one or more indirect payment authorization tokens with the payment instrument in a payment token database record;

storing a push notification device identifier that corresponds to the payment token in the payment token database record;

via a point-of-sale (POS) terminal, entering one of the one or more indirect payment authorization tokens, and transmitting the entered one of the one or more indirect payment authorization tokens via the internet cloud to the server, wherein the server is not collocated with the POS terminal, and wherein communications between the POS terminal and the server are transmitted and received through a gateway device that is collocated with the POS terminal;

via the server, using the payment token to access the push notification device identifier and transmitting a push notification to a guest device that corresponds to the push notification device identifier;

upon acceptance of the push notification, executing a proprietary application on the guest device and simultaneously displaying details for the transaction on both the guest device and POS terminal;

receiving transaction completion data that is entered via the guest device and transmitting the transaction completion data to the server; and completing the transaction at the server and notifying the POS terminal and the guest device that the transaction is complete.

2. The method as recited in claim 1, wherein the payment instrument comprises a credit card number and the one of the indirect payment authorization tokens comprises a room key.

3. The method as recited in claim 1, wherein the payment instrument comprises a credit card number and the one of the indirect payment authorization tokens comprises an identification badge.

4. The method as recited in claim 1, wherein the payment instrument comprises a credit card number and the one of the indirect payment authorization tokens comprises an event ticket.

5. The method as recited in claim 1, wherein the payment instrument comprises a credit card number and the one of the indirect payment authorization tokens comprises a transportation ticket.

6. The method as recited in claim 1, wherein the transaction completion data comprises a tip amount.

7. The method as recited in claim 1, wherein the guest device comprises a smart phone.

8. A non-transitory computer-readable storage medium storing program instructions that, when executed by a computer, cause the computer to perform a method for handoff of a transaction for completion, the method comprising:

registering a payment instrument with a server, associating the payment instrument with one or more indirect payment authorization tokens, and storing a payment token that associates the one or more indirect payment authorization tokens with the payment instrument in a payment token database record;

storing a push notification device identifier that corresponds to the payment token in the payment token database record;

via a point-of-sale (POS) terminal, entering one of the one or more indirect payment authorization tokens, and transmitting the entered one of the one or more indirect payment authorization tokens via the internet cloud to the server, wherein the server is not collocated with the POS terminal, and wherein communications between the POS terminal and the server are transmitted and received through a gateway device that is collocated with the POS terminal;

via the server, using the payment token to access the push notification device identifier and transmitting a push notification to a guest device that corresponds to the push notification device identifier;

upon acceptance of the push notification, executing a proprietary application on the guest device and simultaneously displaying details for the transaction on both the guest device and POS terminal;

receiving transaction completion data that is entered via the guest device and transmitting the transaction completion data to the server; and completing the transaction at the server and notifying the POS terminal and the guest device that the transaction is complete.

9. The non-transitory computer-readable storage medium as recited in claim 8, wherein the payment instrument comprises a credit card number and the one of the indirect payment authorization tokens comprises a room key.

10. The non-transitory computer-readable storage medium as recited in claim 8, wherein the payment instrument comprises a credit card number and the one of the indirect payment authorization tokens comprises an identification badge.

11. The non-transitory computer-readable storage medium as recited in claim 8, wherein the payment instrument comprises a credit card number and the one of the indirect payment authorization tokens comprises an event ticket.

12. The non-transitory computer-readable storage medium as recited in claim 8, wherein the payment instrument comprises a credit card number and the one of the indirect payment authorization tokens comprises a transportation ticket.

13. The non-transitory computer-readable storage medium as recited in claim 8, wherein the transaction completion data comprises a tip amount.

14. The non-transitory computer-readable storage medium as recited in claim 8, wherein the guest device comprises a smart phone.

15. A system for handoff of a transaction for completion, the system comprising:

a server, configured to receive payment instrument, and configured to store a payment token that represents said payment instrument and associate said payment instrument with one or more indirect payment authorization tokens in a payment token database record, and configured to store a push notification device identifier that corresponds to said payment token in said payment token database record; and a point-of-sale (POS) terminal, configured to enter one of said one or more indirect payment authorization tokens, and configured to transmit said one of said one or more indirect payment authorization tokens via the internet cloud to said server, wherein said server is not collocated with said POS terminal, and wherein communications between said POS terminal and said server are transmitted and received through a gateway device that is collocated with said POS terminal;

wherein said server uses said payment token to access said push notification device identifier, and wherein said server transmits a push notification to said guest device;

wherein, upon acceptance of said push notification, said guest device executes a proprietary application, and wherein details for the transaction are transmitted by said server for simultaneous display on both said guest device and said POS terminal;

wherein said guest device receives transaction completion data that is entered and transmits said transaction completion data to said server; and wherein said server completes the transaction and notifies said POS terminal and said guest device that the transaction is complete.

16. The system as recited in claim 15, wherein said payment instrument comprises a credit card number and said one of said indirect payment authorization tokens comprises a room key.

17. The system as recited in claim 15, wherein said payment instrument comprises a credit card number and said one of said indirect payment authorization tokens comprises an identification badge.

18. The system as recited in claim 15, wherein said payment instrument comprises a credit card number and said one of said indirect payment authorization tokens comprises an event ticket.

19. The system as recited in claim 15, wherein said transaction completion data comprises a tip amount.

20. The system as recited in claim 15, wherein said guest device comprises a smart phone.

* * * * *